Patented Oct. 24, 1950

2,527,232

UNITED STATES PATENT OFFICE 2,527,232

BLUING METALS

Wright G. Scroxton, Bradford, Pa.

No Drawing. Application November 4, 1948,
Serial No. 58,365

2 Claims. (Cl. 148—6.24)

This application is a substitute and continuation in part of my application Serial No. 663,612, filed April 19, 1946, for Bluing Metals, now abandoned.

This invention relates to the art of coloring metals and more particularly to the production of a blue color on ferrous metals, such as those commonly used in making gun barrels.

In the art of gun bluing various chemical agents have been employed in the past, but the processes heretofore in use are tedious and time-taking and the results achieved not always satisfactory.

In the course of my experiments with different substances as agents for producing a blue color on ferrous metals, I have found that a dilute, acidified, aqueous solution of a salt of copper and a compound of selenium, gives highly satisfactory results so far as permanence and color intensity are concerned. Furthermore, a composition containing the ingredients mentioned is relatively rapid in action, thus greatly reducing the time required for the coloring process as heretofore practiced, and making possible the successful coloring of such objects by anyone without the use of special apparatus or previous knowledge of the art.

While there are a number of salts of selenium and copper which will suffice to produce a solution effective for the purpose, those with which I have obtained the best results, and which I therefore prefer to use, are copper chloride and selenious acid. Such a solution can be acidified with a suitable acid, such for example, as a strong mineral acid, of which I prefer sulfuric acid.

The rapidity with which the solution reacts with the surface under treatment is accelerated by the addition of a small amount of a wetting agent. Many wetting agents possess properties making them suitable as additions to the composition, but I have found that the substance known by the trade name of Aerosol OS, the principal chemical ingredient of which is propyl naphthalene sodium sulfate, is especially effective and does not react adversely with the other ingredients of the composition. The solution may be prepared without the addition of a wetting agent and it will produce satisfactory results, and a solution in which there is no wetting agent therefore falls within the spirit and scope of my invention.

One solution with which I have obtained highly successful results in producing a blue color on gun barrels, and which I therefore prefer for this purpose is as follows:

| | Percent |
|---|---|
| Distilled water | 94.21 |
| Sulfuric acid, C. P. | 1.01 |
| Copper chloride | 0.93 |
| Selenious acid | 3.70 |
| A wetting agent (Aerosol OS) | 0.14 |
| Coloring, blue | 0.01 |
| | 100.00 |

While the above proportions of the stated ingredients are those which I prefer, and with which I have obtained the best results, it will be understood that my invention is not to be limited to the exact percentages specified, but considerable variation in the same can be made without substantially impairing the efficiency of the solution.

The amount of sulfuric acid present is not critical, but a distinctly acid reaction is necessary to assume successful results in producing a blue color on ferrous metals of the kind mentioned. A variation of at least from .5 percent to an amount such as 1.01 percent in the sulfuric acid content of the solution may be made.

The copper chloride content of the composition may also be varied over a wide range. I have found that percentages of copper chloride from less than one to approximately four and one-half can be successfully employed.

Likewise, the selenium content can be widely varied. Amounts of selenious acid from less than 1 percent to approximately 4 percent, will produce desirable results. If, however, the selenium content is greatly increased, as by doubling the preferred quantity, a powdery residue is left on the surface treated, which must be removed to fully reveal the blue color of the metal.

The wetting agent may be present in an amount sufficient to secure rapid and uniform wetting of the entire surface treated by the solution, depending upon the substance employed for that purpose. I have found amounts of Aerosol OS from about .01 percent to about 1 percent to be effective in accelerating the action of the solution on the ferrous metal surface.

A further example of a composite solution containing the above designated ingredients which I have found to produce desirable results when used in bluing gun barrels, is as follows:

|  | Percent |
|---|---|
| Distilled water | 93.00 |
| Sulfuric acid | .88 |
| Copper chloride | 4.50 |
| Selenious acid | .81 |
| A wetting agent (Aerosol OS) | .81 |
|  | 100.00 |

The blue coloring may be omitted from the solution when sufficient copper salt is present to give the same the desired depth of color.

In the preparation of my new bluing solution I take, for example, five gallons of distilled water to which is first added a wetting agent (Aerosol OS).

Next is added the sulfuric acid which is thoroughly mixed in with the solution.

The copper chloride crystals are then added and thoroughly dissolved in the solution. The blue coloring, when used, is next added to give the solution the desired depth of color.

The final step consists in adding the selenious acid (in powder form) to the solution and the mixture is agitated to cause all the ingredients to become thoroughly dissolved in the solution.

It will be appreciated that the selenious acid is held in solution at the time when the gun barrel, or other metal article to be blued, is brought into contact with the solution, but that with such contact the selenious acid separates rapidly from the other ingredients and accords the article a rich, blue-black color.

The solution can be applied to the gun barrel or other metal article by dipping, or the solution may be applied with a cotton swab that is fastened to a stick.

After treatment with the solution the metal article is then thoroughly washed to remove any surplus acid which would otherwise tend to create rust, and finally a thin coat of oil is applied and the metal is rubbed to a high polish.

The foregoing solution and the method of applying the same to gun barrels and other metal articles provides a simple and expeditious method of performing the operation of what is known as gun bluing.

I claim:

1. A composition of matter for the bluing of a ferrous article such as a gun barrel, composed of a dilute aqueous solution containing from about one one-hundredth of one percent to about one percent of a wetting agent having as its principal active ingredient propyl naphthalene sodium sulfate, from about one-half of one percent to about one percent of sulfuric acid, an effective amount up to about four and one-half percent of copper chloride, from about one percent to about four percent of selenious acid, and the remainder water.

2. A composition of matter for the bluing of a ferrous article such as a gun barrel, composed of a dilute aqueous solution containing one percent each of sulfuric acid and copper chloride, about four percent of selenious acid and the remainder water.

WRIGHT G. SCROXTON.

REFERENCES CITED

The following references are of record in the file of this patent:

UNITED STATES PATENTS

| Number | Name | Date |
|---|---|---|
| 2,303,350 | Fuller | Dec. 1, 1942 |
| 2,348,698 | Thompson | May 9, 1944 |
| 2,408,116 | Von Hippel | Sept. 24, 1946 |